Oct. 3, 1944.    G. G. CURRIE    2,359,466
AIR IMPELLER
Filed July 27, 1942    2 Sheets-Sheet 1
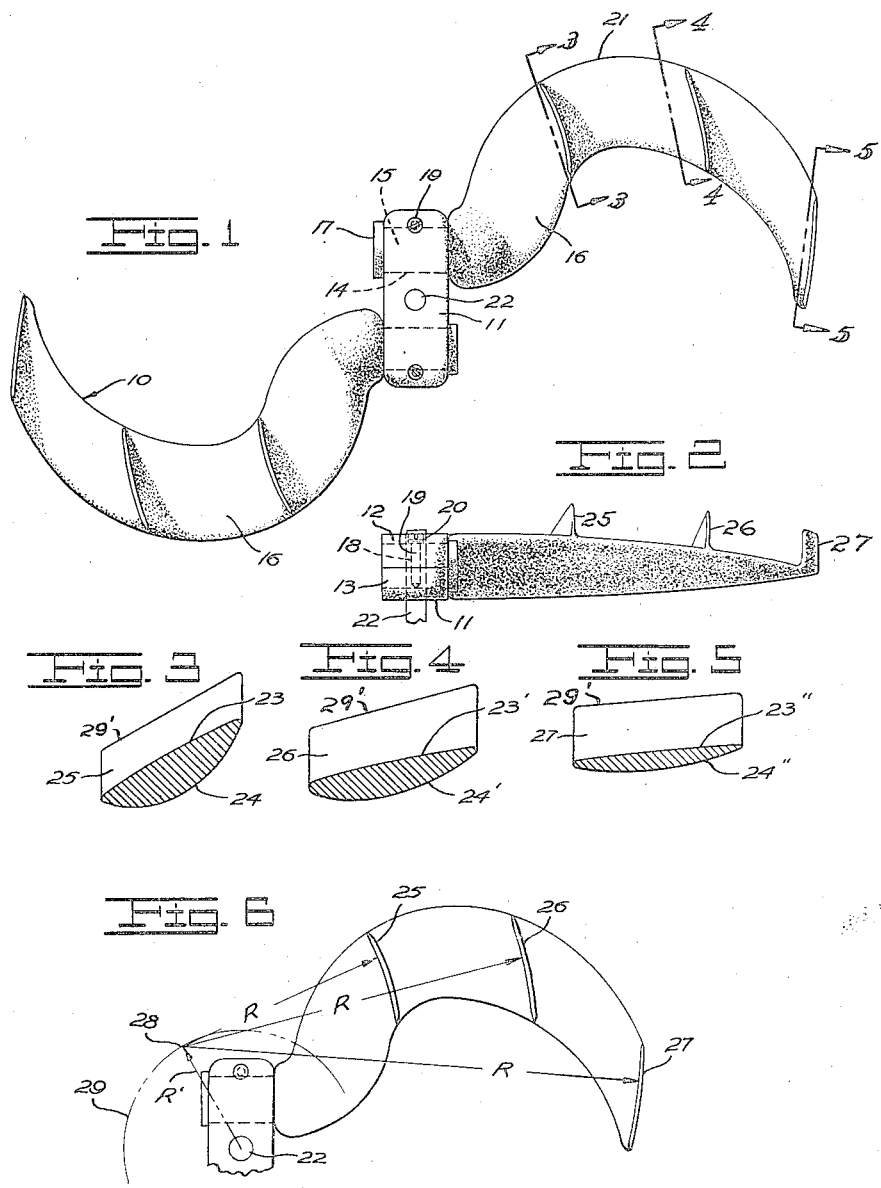
INVENTOR.
G. G. CURRIE
BY

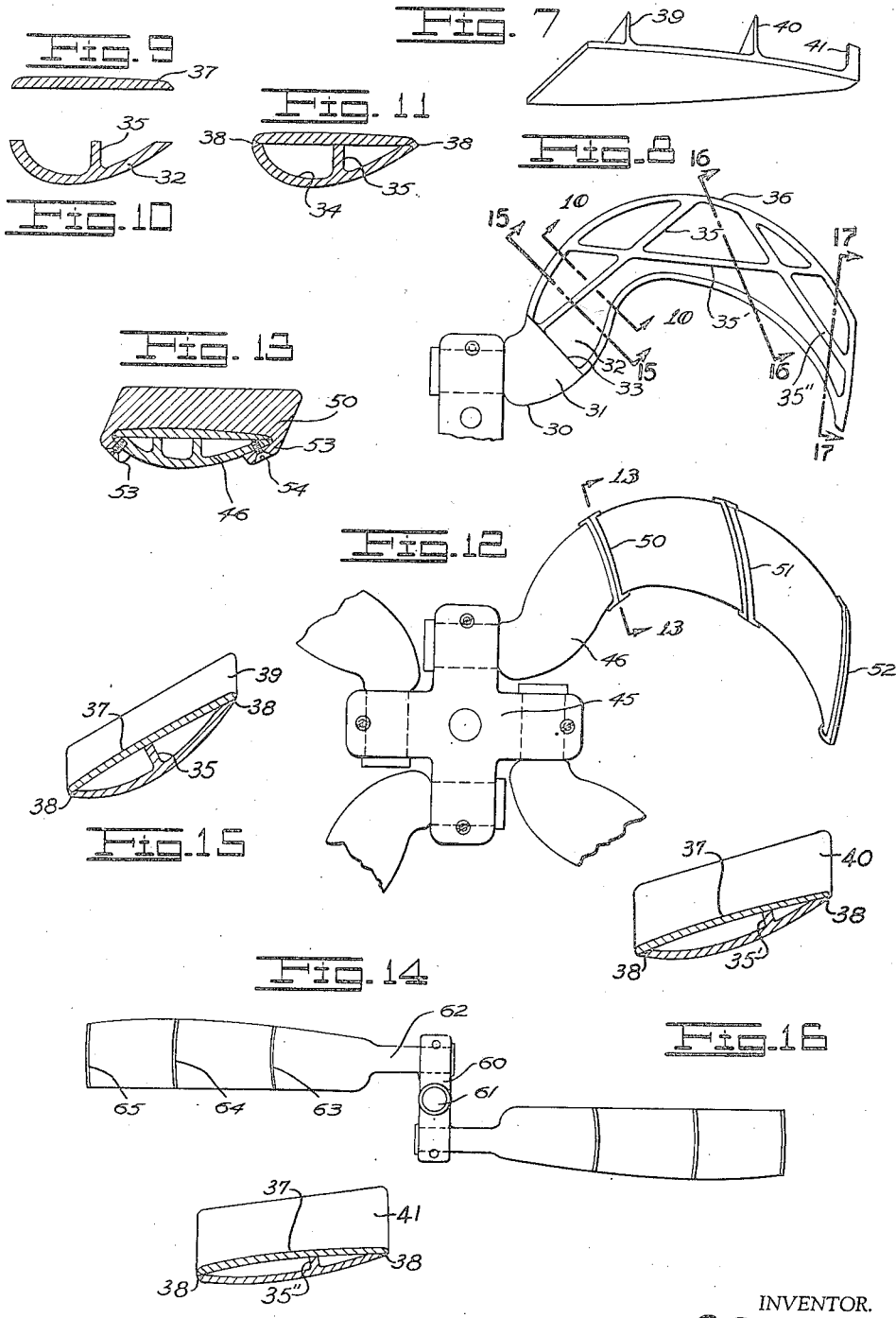

Patented Oct. 3, 1944

2,359,466

UNITED STATES PATENT OFFICE 2,359,466

AIR IMPELLER

Gail G. Currie, Downey, Calif.

Application July 27, 1942, Serial No. 452,441

8 Claims. (Cl. 170—170)

This invention relates to air impellers.

The general object of the invention is to provide an improved air impeller which is particularly adapted for use as an aircraft propeller.

A more specific object of the invention is to provide an improved aircraft propeller wherein the propelling blades are of novel construction.

Another object of the invention is to provide a novel means for mounting an aircraft propeller on a hub member.

A further object of the invention is to provide an airplane propeller including a blade the longitudinal axis of which is arcuate and of novel construction.

A further object of the invention is to provide a novel fin arrangement on an aircraft propeller blade.

Another object of the invention is to provide a novel hollow aircraft propeller blade.

A further object of the invention is to provide an aircraft propeller including a novel blade with fins removably mounted on the blade.

Other objects and advantages of the invention will be apparent from the following description taken in connection with the accompanying drawings, wherein Fig. 1 is a front elevation showing my propeller;

Fig. 2 is a top plan view showing the hub and one of the blades;

Figs. 3, 4, and 5 are sections taken on lines 3—3, 4—4, and 5—5, Fig. 1;

Fig. 6 is a fragmentary front view;

Fig. 7 is a perspective view of a portion of a blade employed in a modification of my invention;

Fig. 8 is a fragmentary top plan view showing the blade with the cover removed;

Fig. 9 is a transverse section showing the cover;

Fig. 10 is a section taken on line 10—10, Fig. 8;

Fig. 11 is a section showing the body and cover united;

Fig. 12 is a fragmentary front elevation showing a modified propeller;

Fig. 13 is a section taken on line 13—13, Fig. 12;

Fig. 14 is a front elevation showing another modified propeller; and

Figs. 15, 16 and 17 are sections showing the modified blade taken on lines 15—15, 16—16 and 17—17, Fig. 8, with the cover in place.

Referring to the drawings by reference characters I have indicated a propeller embodying the features of my invention generally at 10. In Figs. 1 to 6 inclusive the propeller is shown as of the two bladed type; however the number of blades employed in the propeller depends on the requirements in each particular instance.

The propeller is shown as provided with a hub portion 11 which includes an outer member 12 and an inner member 13. The members 12 and 13 are provided with opposed semicylindrical recesses 14 which receive a cylindrical end portion 15 on the propeller blade 16. The end portions 15 include end flanges 17 which engage the hub portions 11 to prevent axial movement of the portion 15.

To prevent rotary motion of the portion 15 in the recesses 14 and to hold the portion 15 in the desired location I provide aligned holes 18 in the portions 12, 13 and 15 which receive a pin 19. The pin 19 as shown includes an upper threaded portion 20 which engages a similarly threaded portion in the portion 12.

The blades 16 are similar and but one of them will be described. Each blade includes an outwardly extending body portion which is arcuate with the leading edge indicated at 21. The hub portion 11 is shown as mounted on a shaft 22. The portion of the blade 16 nearest the shaft 22 has a relatively flat upper face 23 and a lower face 24 of relatively short radius.

In Fig. 3 the shape of the blade is shown as it appears at line 3—3, Fig. 1. Outwardly, as indicated in Fig. 4, the blade at line 4—4, Fig. 1 has a substantially flat upper face 23' and a lower face 24' of longer radius than shown in Fig. 3. In Fig. 5, which is taken on line 5—5, Fig. 1, the upper face 23" appears as substantially flat and the lower face 24" is of longer radius. The pitch of the blade becomes less sharp outwardly from the hub portion 11, as it is clearly shown in Figs. 3, 4 and 5.

The forward face of the blade 16 is provided with a plurality of vanes 25, 26 and 27. The vanes are perpendicular to the forward face of the associated blade. Each of these vanes is arcuate in longitudinal section and the blades have a common center 28, as shown in Fig. 6, with the radius of the blades being indicated at R. The center 28 lies in a circle 29 whose radius is R' and the center of the circle 29 coincides with the axis of the shaft 22. The center 28 is in advance of the axis of the portion 15 of the blade.

The forward face 29' of each vane is substantially parallel to the front face of the portion of blade which is at the root of the vane.

The arrangement of vanes is such that the trailing edge of each vane is closer to the axis of the shaft 22 than the leading edge of the vane so that a column of air is forced towards the center of the propeller.

In Figs. 7 to 11 inclusive I show a modification of my invention, wherein the blades are of hollow construction. Each blade 30 includes a solid portion 31 and a hollow portion 32 which is shown as secured to the portion 31 along the line 33. The blade portion 32 includes a wall 34 and reinforcing rib members 35, 35' and 35". The rib 35 extends outwardly and forwardly towards the leading edge 36. The rib 35' intersects the ribs 35 and 35", while the rib 35" is inclined inwardly and towards the leading edge 36. The portion 32 is provided with a cover 37, the cover and body being secured together by welding, as at 38. The cover is provided with vanes 39, 40 and 41 which correspond in all respects to the vanes 25, 26 and 27 previously described.

In Figs. 12 and 13 I show a further modification of my invention. In the further modification a cruciform hub member 45 is employed. This hub member in the disclosure supports four blades 46. The hub member 45 is similar to the hub member previously described and the blades 46 are held in place in the same manner as that previously described. The blades 46 differ from the blades 16 in that they are of hollow construction and like the blades shown in Figs. 7 to 11 inclusive, except that the vanes 50, 51 and 52 are removable. As shown in Fig. 13 the vane 50 is provided with opposed inwardly extending ears 53 through which screws 54 extend into the blade 46. The vanes 51 and 52 are mounted in the same manner as the vanes 50.

In Fig. 14 I show a modification of my invention, wherein a hub member 60 is mounted on a shaft 61. The hub member supports opposed blades 62 which are straight and substantially parallel to each other and are provided with vanes 63, 64 and 65 which are like the vanes 25, 26 and 27 previously described.

In the operation of my propellers a minimum of noise and a high degree of efficiency is secured. The construction is such that the blades are pulled around as the propeller rotates. The construction permits the blades to lean forward or backward depending upon the location of the part of the hole 18 which is in the part 15.

From the foregoing description it will be apparent that I have invented a novel air impeller which can be economically manufactured and which is highly efficient for its intended purpose.

Having thus described my invention I claim:

1. In a propeller, a shaft, a hub on said shaft, a plurality of arcuate blades extending from said hub, said blades being pitched on their forward face with the pitch decreasing outwardly along the blades, the rear face of each blade being arcuate in cross section with the radius of curvature increasing outwardly along the blade, and a plurality of upstanding transverse vanes on the forward face of each of said blades, said vanes being curved, the vanes on each blade having a common center, said centers being located in advance of the respective blades.

2. In a propeller, a shaft, a hub on said shaft, a plurality of arcuate blades extending from said hub, said blades being substantially flat on their forward face and pitched on their forward face with the pitch decreasing outwardly along the blades, the rear face of each blade being arcuate in transverse cross section with the radius of curvature increasing outwardly along the blade, a plurality of upstanding transverse vanes on the forward face of each of said blades, the vanes on each blade having a common center, said centers being disposed in a circle the center of which coincides with the axis of said shaft whereby the radius of curvature of the vanes on each blade increases outwardly.

3. In a propeller, a shaft, a hub on said shaft, a pair of oppositely disposed arcuate blades extending from said hub, said blades being substantially flat on their forward face and pitched on their forward face with the pitch decreasing outwardly along the blades, the rear face of each blade being arcuate in transverse cross section with the radius of the curvature increasing outwardly along the blade, and a plurality of upstanding transverse vanes on the forward face of each of said blades, said vanes being curved with the center of curvature of each vane disposed in a circle the center of which coincides with the axis of said shaft whereby the radius of curvature of the vanes on each blade increases outwardly, the vanes on each blade having a common center, said centers being in advance of the blades which carry the vanes, the vanes having straight forward edges, the forward edge being pitched with the pitch parallel to the pitch of the front face of the blades and with the pitch decreasing outwardly.

4. In a propeller, a shaft, a hub on said shaft, an arcuate blade extending from said hub, said blade comprising a hollow body portion having reinforcing ribs on the inner face thereof, a cover on said body portion, said blade being pitched on its forward face with the pitch decreasing outwardly along the blade, the rear face of the blade being arcuate in cross section with the radius of curvature increasing outwardly along the blade, and a plurality of upstanding integral transverse vanes on the forward face of said cover, said vanes being curved, the vanes having straight forward edges.

5. In a propeller, a shaft, a hub on said shaft, a blade extending from said hub, said blade being pitched on one face with the pitch decreasing outwardly along the blade, a plurality of upstanding transerse vanes arranged on the forward face of said blade, said vanes having integral tongues thereon engaging the rear face of the blade, and fastening means passing through said tongues and engaging the blade to hold the vanes in place.

6. In a propeller, a shaft, a hub on said shaft, an arcuate blade extending from said hub, said blade comprising a hollow body portion having reinforcing ribs on the inner face thereof, a cover mounted on said body portion, said blade being pitched on its forward face with the pitch decreasing outwardly along the blade, the rear face of the blade being arcuate in cross section with the radius of curvature increasing outwardly along the blade, a plurality of upstanding transverse vanes arranged on the forward face of said blade, said vanes having tongues thereon engaging the rear face of the blade, and fastening means passing through said tongues and engaging the blade to hold the vanes in place.

7. In a propeller, a shaft, a hub on said shaft, a blade extending from sad hub, sad blade comprising a hollow body portion having integral reinforcing ribs on the inner face thereof, a cover on said body portion, said blade being pitched on its forward face with the pitch decreasing outwardly along the blade, the rear face of the blade being arcuate in cross section, and a plurality of upstanding transverse vanes extending forwardly from the forward face of said cover, said vanes being curved.

8. In a propeller, a shaft, a hub on said shaft, a plurality of blades extending from said hub, said blades being pitched with the pitch decreasing outwardly along the blades, and a plurality of upstanding transverse vanes on the forward face of each of said blades, said vanes being curved, the vanes on each blade having a common center, said centers being located in advance of the respective blades.

GAIL G. CURRIE.